US012257915B2

(12) United States Patent
Bai et al.

(10) Patent No.: US 12,257,915 B2
(45) Date of Patent: Mar. 25, 2025

(54) CHARGING OF AN AGV

(71) Applicant: ABB Schweiz AG, Baden (CH)

(72) Inventors: Haofeng Bai, Västerås (SE); Panagiotis Bakas, Västerås (SE); Ahmed Abdelhakim, Västerås (SE); Rajakrishnan Radjassamy, Plano, TX (US); Edward Clark Fontana, Rockwall, TX (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/259,027

(22) PCT Filed: Dec. 29, 2020

(86) PCT No.: PCT/EP2020/087982
§ 371 (c)(1),
(2) Date: Jun. 22, 2023

(87) PCT Pub. No.: WO2022/144075
PCT Pub. Date: Jul. 7, 2022

(65) Prior Publication Data
US 2023/0391211 A1 Dec. 7, 2023

(51) Int. Cl.
*B60L 53/16* (2019.01)
*H02J 7/00* (2006.01)

(52) U.S. Cl.
CPC ............ *B60L 53/16* (2019.02); *H02J 7/0042* (2013.01)

(58) Field of Classification Search
USPC ........................................................ 320/109
See application file for complete search history.

(56) References Cited

U.S. PATENT DOCUMENTS

| 6,498,454 | B1* | 12/2002 | Pinlam | H01M 10/44 |
| | | | | 320/107 |
| 9,276,433 | B2* | 3/2016 | Kim | H02J 50/20 |
| 11,612,824 | B2* | 3/2023 | De-Gol | A63G 7/00 |
| | | | | 701/19 |
| 2010/0308769 | A1* | 12/2010 | Baba | B66F 9/063 |
| | | | | 320/109 |

(Continued)

FOREIGN PATENT DOCUMENTS

| CN | 106208261 A | 12/2016 |
| CN | 206758822 U | 12/2017 |
| CN | 110065645 A | 7/2019 |
| CN | 106602660 B | 12/2019 |

(Continued)

OTHER PUBLICATIONS

Matchar, Emily; "England Is Going to Test Roads That Actually Charge Electric Cars"; Smithsonian Magazine, Innovation, Smithsonian. com; Aug. 20, 2015; 2 Pages.

(Continued)

*Primary Examiner* — Mohammed Alam
(74) *Attorney, Agent, or Firm* — Whitmyer IP Group LLC

(57) ABSTRACT

A charging system for an automated guided vehicle, AGV, is presented. The charging system includes an offboard, meshed charging grid and onboard contact pads. The offboard, meshed charging grid including a charging pole in each grid point, wherein adjacent charging poles are configured with opposite polarity of a charging current. The onboard contact pads include four separate contact pads. An AGV is also presented.

11 Claims, 3 Drawing Sheets

(56) References Cited

U.S. PATENT DOCUMENTS

| | | | | |
|---|---|---|---|---|
| 2011/0133691 | A1* | 6/2011 | Hautanen | H02J 50/90 |
| | | | | 320/108 |
| 2012/0217927 | A1* | 8/2012 | Virk | B60L 53/14 |
| | | | | 320/109 |
| 2012/0282065 | A1* | 11/2012 | Virk | B60L 50/52 |
| | | | | 414/222.13 |
| 2015/0258908 | A1* | 9/2015 | Fukui | B60L 58/21 |
| | | | | 320/162 |
| 2018/0074486 | A1* | 3/2018 | Krishnamoorthy | G08G 5/0069 |
| 2018/0241343 | A1* | 8/2018 | Jiang | B08B 13/00 |
| 2019/0059152 | A1* | 2/2019 | Boozer | H05K 5/064 |
| 2020/0269712 | A1* | 8/2020 | Kozlovsky | H02J 50/10 |
| 2021/0031947 | A1* | 2/2021 | Wankewycz | B60L 50/60 |
| 2023/0391211 | A1* | 12/2023 | Bai | H02J 7/0042 |

FOREIGN PATENT DOCUMENTS

| | | | | |
|---|---|---|---|---|
| CN | 210175020 U | 3/2020 | | |
| WO | 2007099412 A1 | 9/2007 | | |
| WO | WO-2022144075 A1 * | 7/2022 | | B60L 53/11 |

OTHER PUBLICATIONS

International Search Report and Written Opinion of the International Searching Authority; Application No. PCT/EP2020/087982; Completed: Jun. 24, 2021; Mailing Date: Jul. 6, 2021; 14 Pages.
International Preliminary Report on Patentability; Application No. PCT/EP2020/087982; Completed: Jul. 4, 2023; 7 Pages.
Chinese Office Action; Application No. 202080108081.0; Issued: Dec. 27, 2023; 4 Pages.

* cited by examiner

CHARGING OF AN AGV

TECHNICAL FIELD

The present disclosure relates to charging of automated guided vehicles.

BACKGROUND

Contact charging is the most common charging method for mobile robots or automated guided vehicles (AGVs). Based on the charging time, the charging solutions can be classified to the long-time duration charging (from ten minutes to several hours) and opportunity charging. From battery point of view, opportunity charging is advantageous since it not only allows longer battery lifetime due to lower depth of discharge (DOD) but also reduces the requirement for onboard energy storage capacity. Opportunity charging can be done by sophisticated charging contacts. More common practice is however to use a charging pad, and with two pads on both the charger side and on the AGV side.

Dynamic charging belongs to the opportunity charging category. It allows the AGV to be charged while it is moving. However, the dynamic charging solution today is more like an extension of the opportunity charging solution with elongated charging pads. For example, a dynamic charging rail.

The dynamic charging solution with charging rails represents the state of art for contact charging today. However, it has the following drawbacks:

In a typical AGV application, the paths where the AGV move need to be optimized dynamically. However, with the charging rail, the AGV needs to be aligned with the rail before the charging starts.

For multiple AGVs on the same charging rails, their speed must be the same to avoid collision.

SUMMARY

One objective is to improve a contact interface for charging of automated guided vehicles (AGVs).

According to a first aspect there is provided a charging system for an AGV. The charging system comprises an offboard, meshed charging grid and onboard contact pads. The offboard, meshed charging grid comprises a charging pole in each grid point, wherein adjacent charging poles are configured with opposite polarity of a charging current. The onboard contact pads comprise four separate contact pads.

Each contact pad may have a form of a circle, and each charging pole may have a form of a circle.

Each charging pole may be arranged at a distance from other charging poles with opposite polarity, and the distance may be at least five times that of a diameter of each charging pole.

Each contact pad may have a slightly smaller diameter than the distance between the charging poles with opposite polarity, and may be distanced from other contact pads to prevent spark-over therebetween.

The onboard contact pads may further comprise a further contact pad centred inside the four separate contact pads to achieve dynamic charging.

The onboard contact pads may be arranged in the corners of a square outline.

The onboard contact pads may be arranged in a circular outline.

The onboard contact pads may be configured to receive a charging current from the offboard meshed charging grid when at least two of the four separate contact pads are connected to two charging poles with opposite polarity.

According to a second aspect an AGV is presented. The AGV comprises four separate contact pads arranged in the corners of a square configuration and are configured to receive a charging current from an offboard meshed charging grid with charging poles when at least two of the four separate contact pads are connected to two charging poles with opposite polarity of the offboard meshed charging grid.

With the presented design of the offboard charging grid and the onboard contact pads an improved charging system is achieved. The grid may e.g. cover the charging area in a warehouse with AGVs.

Contact between the offboard charging poles and onboard contact pads do not require alignment of the AGV with the charging infrastructure. The AGV can move freely in the charging area, and is also easy to install.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

A contact charging system is presented which can be used for static charging, even though the system is particularly useful for dynamic charging of an automated guided vehicle (AGV) in a charging area of a grid. The charging area is created with a meshed grid of charging poles. Once the AGV enters this area it can get be charged from the poles. Design of the charging poles of the grid and the contact pads on the AGV can be made so that a solid contact is guaranteed and the risk of short-circuit is eliminated. Compared to the conventional solution, there is no need to align the AGV with the charging infrastructure. The AGV does thus not lose its ability to move freely, even when it is charging.

An AGV is an electrically driven platform that can be moved without a predefined path, e.g. with the feature of self-guidance.

The charging poles form a mesh grid with alternating positive and negative charging poles. The positive and negative charging poles are round pads. Electric contact between the contact pads of the AGV and the charging poles are achieved with direct contact, i.e. by galvanic connection.

Figure 1:
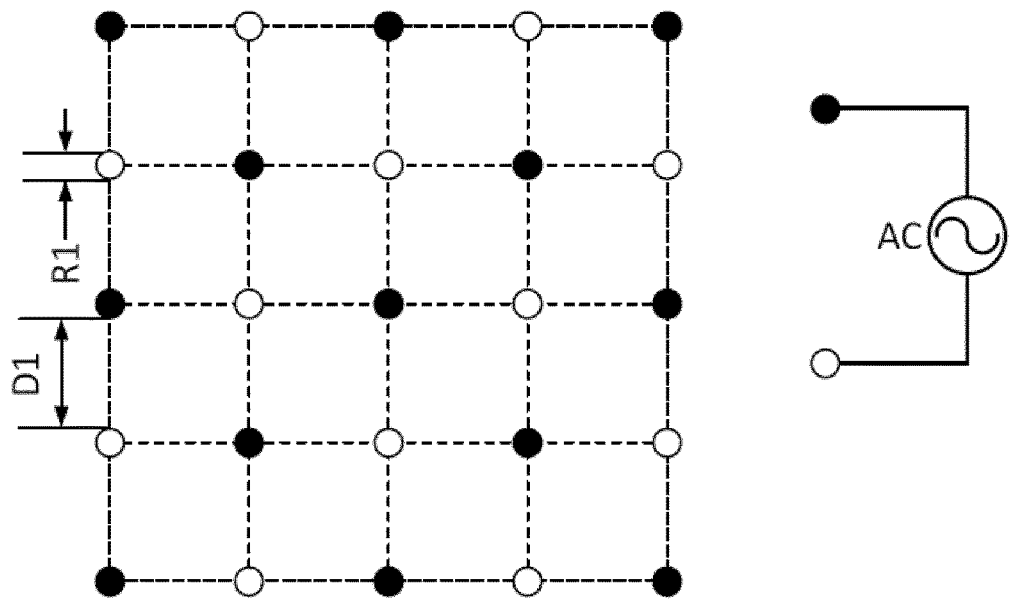
FIG. 1 is a schematic illustration showing a meshed charging grid.

The offboard charging grid is shown in FIG. 1. The black and white circles represent different polarity. All the black circles are interconnected and the same holds for all the white circles. The voltage between the black and white circles is AC voltage. The diameter of the circles is R1. The distance between adjacent circles with different colours/polarities is D1. The distance between two adjacent circles with the same colour is approximately 1.4×D1 while D1 is at least five times larger than R1.

Figure 2:
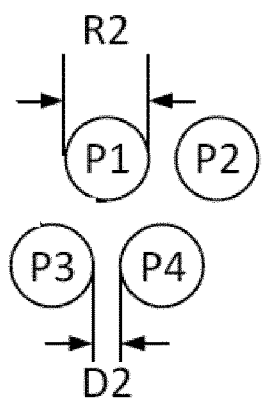
FIG. 2 is a schematic illustration showing layouts of contact pads of an AGV for use in connection with the meshed charging grid shown in FIG. 2.
Figure 3:
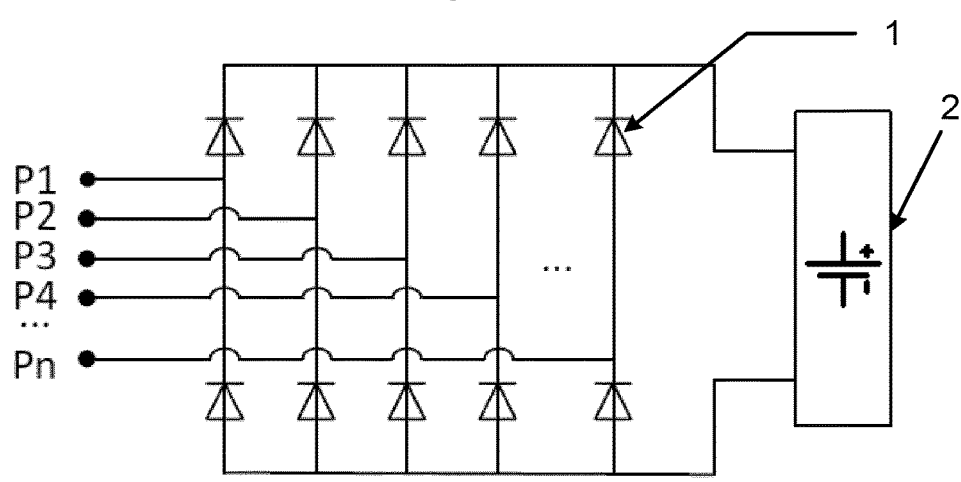
FIG. 3 is a schematic illustration showing an onboard circuit topology for use in connection with an AGV with contact pads as shown in FIG. 3.

One onboard charging pad design is shown in FIG. 2 with four contact pads P1-P4. Inside the AGV, illustrated in FIG. 3, there is a diode rectifier 1 with n phase legs. The AC 2 terminal of the $i^{th}$ (i=1, 2, 3, 4, ..., n) phase leg is connected to contact pad $P_i$. Once there are at least two pads connected to circles with different colours shown in FIG. 1, the onboard energy storage will be charged from the AC network. The rectifier can be composed of commercial modules. A one-phase solution is illustrated, but the same is applicable for a three-phase solution.

The charging pad, with the contact pads P1-P4, should be as big, i.e. having as big circular area, as possible to increase the contact possibility, but small enough so that it does not create a short circuit by connecting the white and black circles, i.e., the terminals of the AC source. Based on these dimensioning requirements, the diameter of the charging pad, denoted as R2, should be slightly smaller than the distance D1. R2 may be about 0.9 times D1. The distance between two adjacent contact pads, denoted D2, should be small but above the above the clearance distance defined by the magnitude of the AC source.

Figure 4:
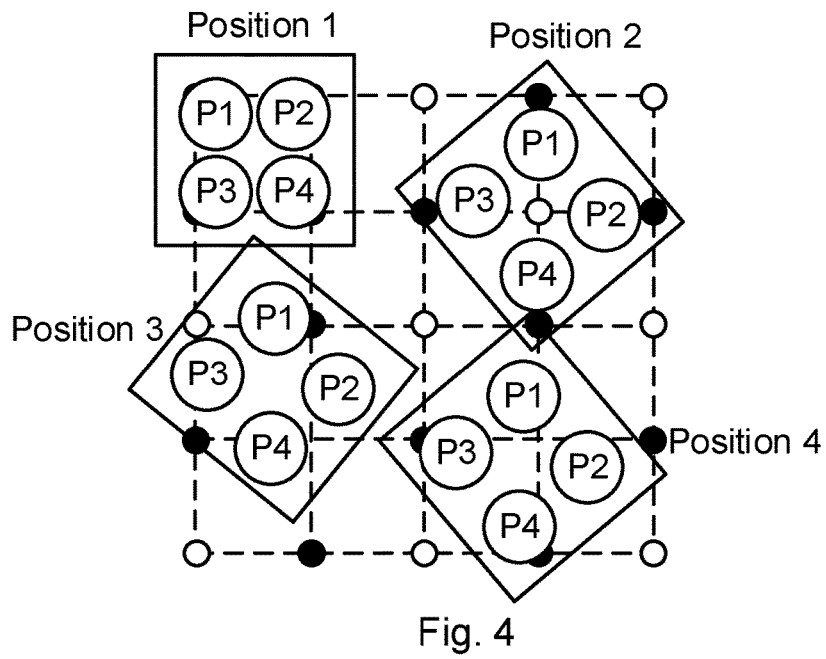
FIG. 4 is a schematic illustration showing possible positions of charging poles with a layout as shown in FIG. 2.
Figure 5:
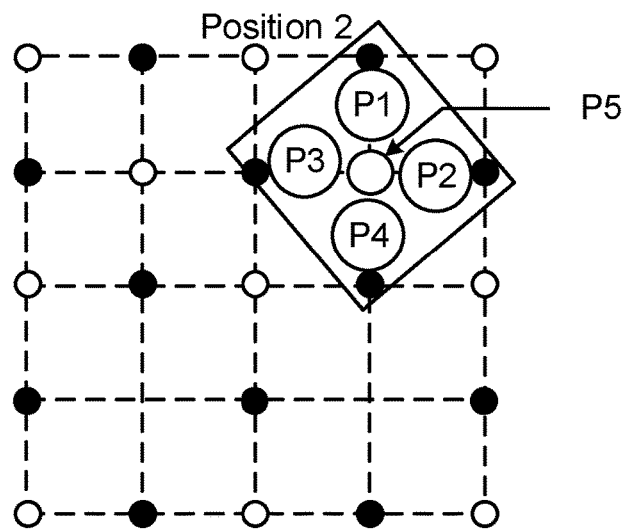
FIG. 5 is a schematic illustration showing a charging poles configuration providing continuous charging.

One example of the contact pad concept is shown in FIG. 2 with n=4. Some possible positions of the contact pads relative to the charging grid are illustrated in FIG. 4. The contact pads can be seen as arranged in the corners of a square outline. The active charging pad carrying current is: P1-P4 for position 1; P1 and P4 for position 3; and P1, P3 and P4 for position 4. In positions 1, 3 and 4, the AGV is being charged, whereas in position 2, all four pads are connected to only one polarity and the AGV is not charged. The existence of position 2 indicates that the charging may be discontinuous. However, continuous charging can be improved by putting another contact pad P5 in the centre of the square outline of the charging pad, as illustrated in FIG. 5.

It should be noted that there can be many methods to allocate the contact pads, such as arranged to form a circle. The charging pad of the AGV may further comprise more contact pads then the presented four or five contact pads.

Figure 6:
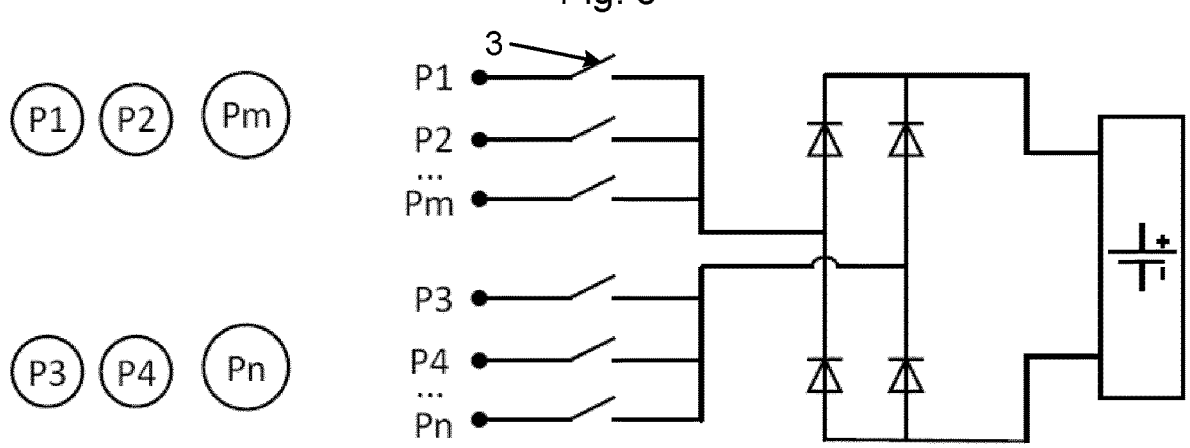
FIG. 6. is a schematic illustration showing an onboard charging pad configuration with reduced rectifier legs.

One alternative solution is shown in FIG. 6. Only one one-phase or three-phase diode rectifier is used. More than one contact pad is connected to one AC terminal of the rectifier through a switch 3. If onboard pads of the same AC terminal of the rectifier (P1, P2, ..., Pm, or P3, P4, ..., Pn) get connected to offboard charging pads with different polarity, the switches related to the onboard pads can be controlled to avoid a short circuit of the AC source. The switch 3 can be a simple relay and controlled in such a way that only one switch is conducting at a time within one group.

Charging Area Control

In order to avoid having all the area of the offboard charging grid energized, there can be simple sensors to detect the AGV. For example, a simple infrared transmitter and receiver can be used. Once the AGV enters the area, a switch can be closed to connect the offboard charging pads to the AC source.

Figure 7:
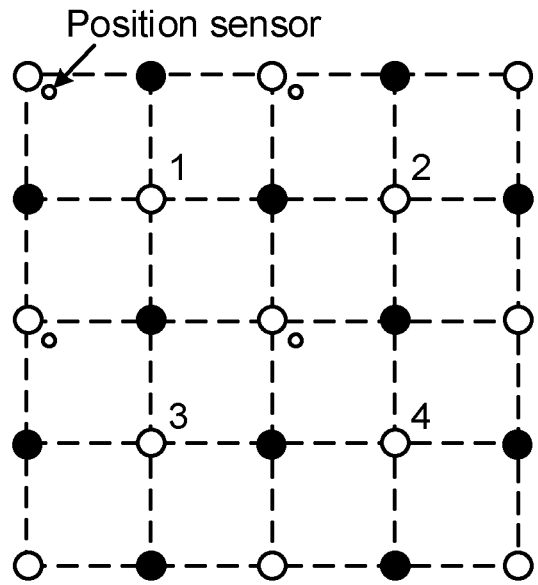
FIG. 7 is a schematic illustration showing charging area control with a position sensor.

One example of this concept is shown in FIG. 7, where the offboard charging area is split in 4 different subareas, i.e., 1, 2, 3, 4. Each subarea has its own position sensor that is used to detect when an AGV has entered the area. If an AGV is detected, then the offboard charging pads of the specific subarea can be energized by being connected to the AC source.

Implementation and Maintenance

Figure 8:
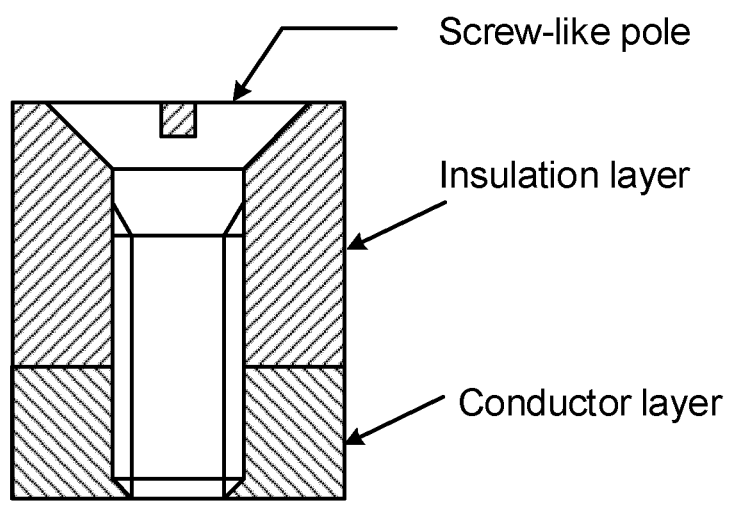
FIG. 8 is a schematic illustration showing an implementation of an offboard charging pad with screw-like poles.

The offboard charging pad should be easy to maintain. One implementation of individual charging pole is shown in FIG. 8. The charging pole can be made from screw-like poles that are connected to a conductor layer via an insulation layer. Several of those offboard charging poles can be interconnected to form a mesh grid that can act as one offboard charging pad. The charging pad can be disassembled easily once the pole is worn-out. The conductor layer will have no friction with the AGV and have very long lifetime.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A charging system for an automated guided vehicle, AGV, comprising an offboard, meshed charging grid and onboard contact pads, wherein:
   the offboard, meshed charging grid comprises a charging pole in each grid point, wherein adjacent charging poles are configured with opposite polarity of a charging current;
   the onboard contact pads include four separate contact pads; and
   the onboard contact pads further comprise a further contact pad centred inside the four separate contact pads to achieve dynamic charging.

2. The charging system according to claim 1, wherein each contact pad has a form of a circle, and each charging pole has a form of a circle.

3. A charging system for an automated guided vehicle, AGV, comprising an offboard, meshed charging grid and onboard contact pads, wherein:
   the offboard, meshed charging grid comprises a charging pole in each grid point, wherein adjacent charging poles are configured with opposite polarity;
   the onboard contact pads include four separate contact pads;
   each contact pad has a form of a circle, and each charging pole has a form of a circle;

each charging pole is arranged at a distance from other charging poles with opposite polarity, and the distance is at least five times that of a diameter of each charging pole; and and the onboard contact pads further comprise a further contact pad centred inside the four separate contact pads to achieve dynamic charging.

4. The charging system according to claim 3, wherein each contact pad has a slightly smaller diameter than the distance between the charging poles with opposite polarity, and is distanced from other contact pads to prevent spark-over therebetween.

5. The charging system according to claim 1, wherein the onboard contact pads are arranged in the corners of a square outline.

6. The charging system according to claim 1, wherein the onboard contact pads are arranged in a circular outline.

7. The charging system according to claim 1, wherein the onboard contact pads are configured to receive a charging current from the offboard meshed charging grid when at least two of the four separate contact pads are connected to two charging poles with opposite polarity.

8. An automated guided vehicle, AGV, comprising:
four separate contact pads arranged in the corners of a square configuration; and
a further contact pad centred inside the four separate contact pads;
wherein the four separate contact pads and the further contact pad constitute onboard contact pads that are configured to achieve dynamic charging and receive a charging current from an offboard meshed charging grid with charging poles when at least two of the four separate onboard contact pads are connected to two charging poles with opposite polarity of the offboard meshed charging grid.

9. The charging system according to claim 3, wherein the onboard contact pads are arranged in the corners of a square outline.

10. The charging system according to claim 3, wherein the onboard contact pads are arranged in a circular outline.

11. The charging system according to claim 3, wherein the onboard contact pads are configured to receive a charging current from the offboard meshed charging grid when at least two of the four separate contact pads are connected to two charging poles with opposite polarity.

* * * * *